(12) United States Patent
Marupaduga et al.

(10) Patent No.: US 10,903,895 B1
(45) Date of Patent: Jan. 26, 2021

(54) SCHEDULING MU-MIMO RESOURCES IN RELAYED NETWORKS

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/360,123

(22) Filed: Mar. 21, 2019

(51) Int. Cl.
*H04B 7/155* (2006.01)
*H04B 7/0452* (2017.01)
*H04W 72/12* (2009.01)
*H04W 88/18* (2009.01)
*H04W 8/22* (2009.01)
*H04W 8/00* (2009.01)

(52) U.S. Cl.
CPC ......... *H04B 7/1555* (2013.01); *H04B 7/0452* (2013.01); *H04W 8/005* (2013.01); *H04W 8/22* (2013.01); *H04W 72/1242* (2013.01); *H04W 72/1263* (2013.01); *H04W 88/18* (2013.01)

(58) Field of Classification Search
CPC ... H04B 7/1555; H04B 7/0452; H04W 8/005; H04W 8/22; H04W 72/1242; H04W 72/1263; H04W 88/18
See application file for complete search history.

(56) References Cited

U.S. PATENT DOCUMENTS

| 8,774,253 | B2 | 7/2014 | Miyoshi et al. |
| 10,034,292 | B1 * | 7/2018 | Liu ................... H04W 72/0446 |
| 10,149,225 | B1 * | 12/2018 | Oroskar ................ H04W 40/16 |
| 2010/0135177 | A1 | 6/2010 | Liu et al. |

* cited by examiner

*Primary Examiner* — Chi H Pham
*Assistant Examiner* — Ji-Hae Yea

(57) ABSTRACT

A wireless network is configured to utilize a multi-user multiple-input multiple-output (MU-MIMO) operating mode. a first subset of wireless devices in a sector that are configured as relay nodes are identified. A second subset of wireless devices in the sector that are not configured as relay nodes are also identified. One or more wireless device in the first subset of wireless devices are instructed, allocated resources, or otherwise controlled to not utilize the MU-MIMO operating mode.

14 Claims, 7 Drawing Sheets

US 10,903,895 B1

SCHEDULING MU-MIMO RESOURCES IN RELAYED NETWORKS

TECHNICAL BACKGROUND

Wireless networks incorporating access nodes, relay nodes, and other small-cell access nodes are becoming increasingly common. These may be referred to as heterogeneous networks. Relay nodes improve service quality by relaying communication between an access node, and end-user wireless devices in the wireless network. For example, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto.

Wireless networks may also be configured to utilize a single-user multiple-in multiple-out (SU-MIMO) operating mode and/or a multi-user (MU-MIMO) mode. In the SU-MIMO operating mode, multiple data streams are directed towards individual wireless devices and/or relay nodes. In the MU-MIMO operating mode, the multiple data streams can be directed towards wireless devices and/or relay nodes that are selected to participate in the MU-MIMO operating mode based on the orthogonality of transmission. This helps maximize resources.

Overview

Exemplary embodiments described herein include a method for scheduling resources in a wireless network configured to utilize a multi-user multiple-input multiple-output (MU-MIMO) operating mode includes identifying a first subset of wireless devices in a sector that are configured as relay nodes. The method further includes identifying a second subset of wireless devices in the sector that are not configured as relay nodes. The method further includes instructing a first at least one wireless device in the first subset of wireless devices not to utilize the MU-MIMO operating mode.

An exemplary system for scheduling resources in a wireless network configured to utilize a multi-user multiple-input multiple-output (MU-MIMO) operating mode comprises a processing node and a processor coupled to the processing node. The processor is configured to perform operations that include associating a first subset of wireless devices in a sector with first indicators that each in the first subset of wireless devices are configured as relay nodes, and instructing a first at least one wireless device in the first subset of wireless devices to not utilize the MU-MIMO operating mode.

An exemplary processing node for scheduling resources in a wireless network configured to utilize a multi-user multiple-input multiple-output (MU-MIMO) operating mode is configured to perform operations including determining a first wireless device in a sector is included in a set of wireless devices configured as relay nodes attached to an access node in the wireless network, and based on determining that the first wireless device is included in the set of wireless devices configured as relay nodes, instructing the first wireless device to not utilize the MU-MIMO operating mode.

DETAILED DESCRIPTION

Figure 1:
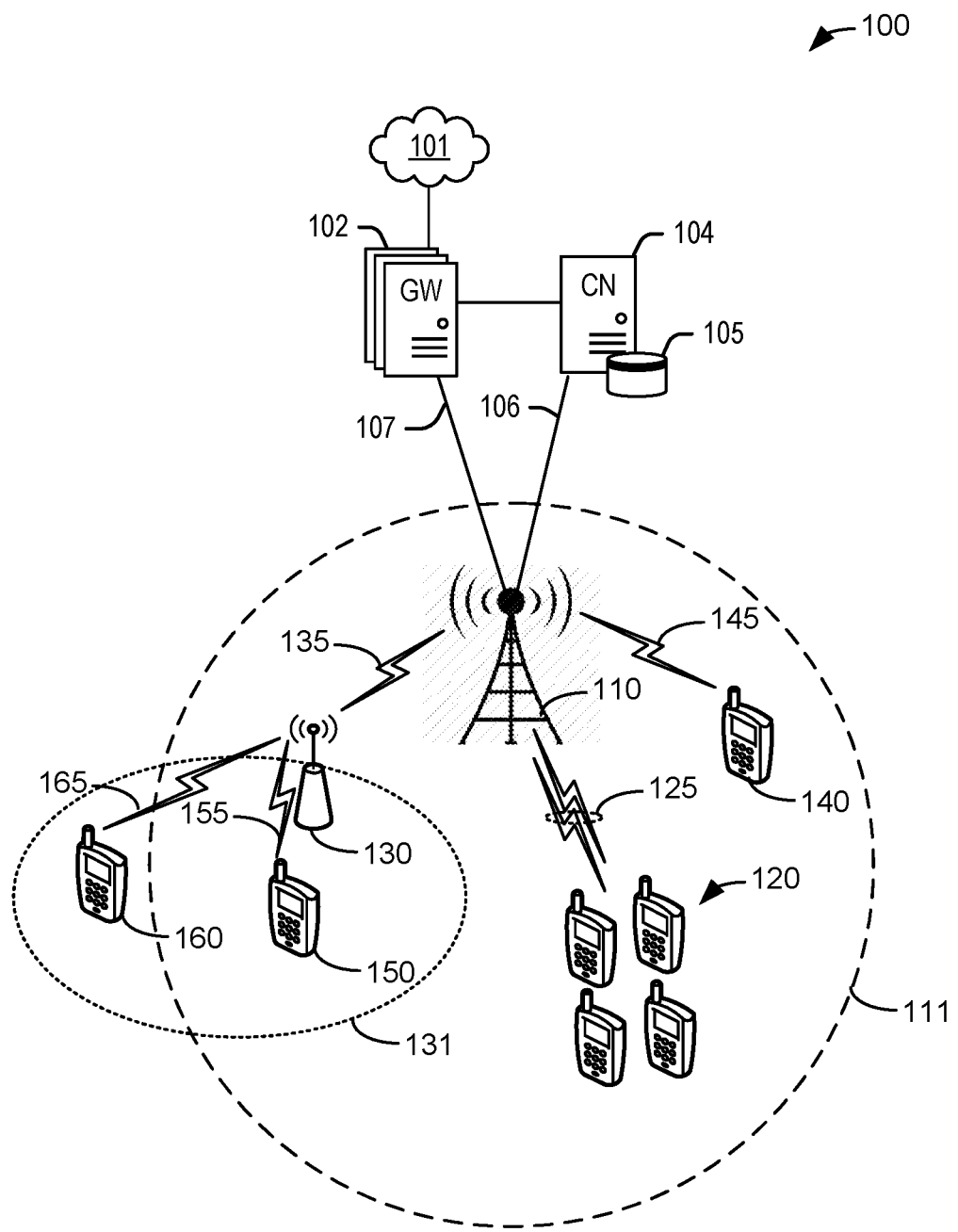
FIG. 1 is a block diagram illustrating an example communication system.

In embodiments disclosed herein, a wireless network is capable of communicating with wireless devices using multi-user multiple-input multiple-output (MU-MIMO) operating mode. The wireless network and wireless devices are also capable of using the wireless devices as relay nodes. Wireless devices that are configured as relay nodes are dynamically detected. The wireless devices configured as relay nodes are instructed to not utilize the MU-MIMO operating mode. This helps the wireless devices that are also carrying traffic for other devices to receive their own air-interface (and other) resources of the network rather than receiving shared resources.

In embodiments disclosed herein, method for scheduling resources in a wireless network configured to utilize a MU-MIMO operating mode includes identifying a first subset of wireless devices in a sector that are configured as relay nodes, identifying a second subset of wireless devices in the sector that are not configured as relay nodes, instructing a first at least one wireless device in the first subset of wireless devices not to utilize the MU-MIMO operating mode. Alternatively or in addition, a second at least one wireless device in the second subset of wireless devices may be instructed to start utilizing the MU-MIMO operating mode. The instructing the second at least one wireless device to start utilizing the MU-MIMO operating mode may further comprise determining that the second at least one wireless device reports a signal measurement higher than reported by other wireless devices in the second subset of wireless devices.

In addition, it may be determined that a number of end-user wireless devices attached to a first wireless device in the first subset of wireless device meets a first threshold number. Based on the number of end-user wireless devices meeting the first threshold number, a priority of resources allocated towards the first wireless device may be increased. Based on the number of end-user wireless devices meeting a second threshold number, the first wireless device in the first subset of wireless device may be instructed to start utilizing the MU-MIMO operating mode. These identifying, determining, and instructing operations may be performed within a time period. The time period is configurable, in that it can be adjusted by an operator of the wireless network, or by an automated feedback mechanism.

In another exemplary embodiment, a system for scheduling resources in a wireless network configured to utilize a multi-user multiple-input multiple-output (MU-MIMO) operating mode includes a processing node and a processor coupled to the processing node. The processor is configured to perform operations including associating a first subset of wireless devices in a sector with first indicators that each in the first subset of wireless devices are configured as relay nodes, instructing a first at least one wireless device in the first subset of wireless devices to not utilize the MU-MIMO operating mode.

The processor may be further configured to associate the first at least one wireless device in the first subset of wireless devices that have been instructed to stop utilizing the MU-MIMO operating mode with third indicators that each of the first at least one wireless device is not to be instructed to utilize the MU-MIMO operating mode. The processor may be further configured to also associate a second subset of wireless devices in the sector with fourth indicators that each in the second subset of wireless devices are not configured as relay nodes. The processor may be further configured to instruct a second at least one wireless device in the second subset of wireless devices to start utilizing the MU-MIMO operating mode. Instructing the second at least one wireless device to start utilizing the MU-MIMO operating mode may include determining that the second at least one wireless device reports a signal measurement higher than reported by other wireless devices in the second subset of wireless devices.

The processor may be further configured to determine that a number of end-user wireless devices attached to a first wireless device in the first subset of wireless device meets a first threshold number. The processor may be further configured to, based on the number of end-user wireless devices meeting the first threshold number, increase a priority of resources allocated towards the first wireless device. The processor may be further configured to, based on the number of end-user wireless devices meeting a second threshold number, instruct the first wireless device in the first subset of wireless device to start utilizing the MU-MIMO operating mode.

In another exemplary embodiment, a processing node for scheduling resources in a wireless network configured to utilize a multi-user multiple-input multiple-output (MU-MIMO) operating mode is configured to perform operations including determining a first wireless device in a sector is included in a set of wireless devices configured as relay nodes attached to an access node in the wireless network, and based on determining that the first wireless device is included in the set of wireless devices configured as relay nodes, instructing the first wireless device to not utilize the MU-MIMO operating mode. The processing node may also be configured to determine a second wireless device in the sector is not included in the set of wireless devices configured as relay nodes attached to the access node in the wireless network, and based on determining that the second wireless device is not included in the set of wireless devices configured as relay nodes, instruct the second wireless device to start utilizing the MU-MIMO operating mode. The processing node may also be configured to determine that a number of end-user wireless devices attached to the first wireless device meets a first threshold number. The processing node may also be configured to, based on the number of end-user wireless devices meeting the first threshold number, increase a priority of resources allocated towards the first wireless device. The processing node may also be configured to, based on the number of end-user wireless devices meeting a second threshold number, instruct the first wireless device to start utilizing the MU-MIMO operating mode.

These and additional operations are further described with respect to the embodiments depicted in FIGS. 1-7.

FIG. 1 is a block diagram illustrating an example communication system. System 100 comprises a communication network 101, gateway node(s) 102, controller node 104, access node 110, relay node 130, and wireless devices 120, 140, and 150. Access node 110 is illustrated as deploying a wireless air interface coverage area 111 (a.k.a., a sector). Relay node 130 and wireless devices 120, 140, and 150 are located within coverage area 111 and accessing network services from access node 110. Relay node 130 may be configured to communicate with access node 110 over communication link 135, (hereinafter, "wireless backhaul" or simply "backhaul"), and is further configured to deploy additional wireless air interfaces over coverage areas 131. Wireless device 150 is configured to attach to the wireless air interface of relay node 130. Wireless devices 160 is configured to attach to the wireless air interface of relay node 130. Further, wireless devices 150, 160 may access network services using the combination of relay node 130 and wireless backhaul link 135, rather than directly connecting to (and potentially overloading) access node 110. Moreover, wireless device 160 that is illustrated as being outside coverage area 111 of access node 110 may access network services from access node 110 by virtue of being connected to relay node 130. Consequently, access node 110 may be termed a "donor" access node. In other embodiments, any other combination of wireless devices, donor access nodes, relay access nodes, and carriers deployed therefrom may be evident to those having ordinary skill in the art in light of this disclosure.

In operation, access node 110 (or any other entity within system 100) may be configured to execute a method for scheduling resources, including identifying a first subset of wireless devices in a sector that are configured as relay nodes (i.e., relay node 130), identifying a second subset of wireless devices in the sector that are not configured as relay nodes, (i.e., one or more of wireless devices 120 and 140), and instructing a first at least one wireless device in the first subset of wireless devices 120, 140 not to utilize the MU-MIMO operating mode. Alternatively or in addition, a second at least one wireless device in the second subset of wireless devices 120, 140 may be instructed to start utilizing the MU-MIMO operating mode. The instructing the second at least one device 120, 140 to start utilizing the MU-MIMO operating mode may further comprise determining that the second at least one wireless device (e.g., wireless devices 120) reports a signal measurement higher than reported by other wireless devices (e.g., wireless device 140) in the second subset of wireless devices.

In addition, it may be determined that a number of end-user wireless devices (i.e., wireless devices 150, 160) attached to a first wireless device in the first subset of wireless devices 150, 160 meets a first threshold number (e.g., 20 attached devices, 30 attached devices, etc.). Based on the number of end-user wireless devices 150, 160 meeting the first threshold number, a priority of resources allocated towards the first wireless device may be increased.

The resources described herein may be, for example, physical resource blocks (PRBs) within one or more subframes of a radio-air interface deployed by an access node. For example, a subframe can comprise a plurality of PRBs allocated for control information (e.g. within a control channel) and for data transmission (e.g. within a data channel).

Based on the number of end-user wireless devices meeting a second threshold number (e.g., zero attached devices), the first wireless device may be instructed to start utilizing the MU-MIMO operating mode. These identifying, determining, and instructing operations may be performed within a time period. The time period is configurable, in that it can be adjusted by an operator of the wireless network, or by an automated feedback mechanism.

Access node 110 can be any network node configured to provide communication between relay node 130, wireless devices 120, 140, 150, 160 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. By virtue of comprising a plurality of antennae as further described herein, access node 110 can deploy or implement multiple-input-multiple-output (MIMO) modes, such as single user MIMO (SU-MIMO), or multi-user MIMO (MU-MIMO) modes. In an exemplary embodiment, access node 110 may utilize hundreds of antennae to simultaneously transmit each of a plurality of different data streams (such as MU-MIMO data stream 125) to a corresponding plurality of wireless devices (such as wireless devices 120). Moreover, it is noted that while access node 110 is illustrated in FIG. 1, any number of access nodes can be implemented within system 100.

Relay node 130 may comprise any short range, low power, small-cell access nodes such as a microcell access node, a picocell access node, a femtocell access node, or a home eNodeB device. In addition, relay node 130 may comprise a small-cell access node paired with a relay wireless device configured to communicate over backhaul 135.

Access node 110 and relay node 130 can each comprise a processor and associated circuitry to execute or direct the execution of computer-readable instructions to perform operations such as those further described herein. Briefly, access node 110 and relay node 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay node 130 can receive instructions and other input at a user interface. Access node 110 communicates with gateway node 102 and controller node 104 via communication links 106, 107. Access node 110 and relay node 130 may communicate with each other, and other access nodes (not shown), using a wireless link or a wired link such as an X2 link. Components of exemplary access nodes 110 and relay node 130 are further described with reference to FIGS. 2-4.

Wireless devices 120, 140, 150, 160 may be any device, system, combination of devices, or other such communication platform capable of communicating wirelessly with access node 110 and/or relay node 130 using one or more frequency bands deployed therefrom. Each of wireless devices 120, 140, 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 140, 150, 160. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of relay node 130, resource requirements of end-user wireless devices 120, 140, 150, 160, and relay node 130, priority levels associated therewith, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

In another exemplary embodiment, a processing node coupled to a network entity in system 100 can be configured to perform operations including determining a first wireless device in a sector 111 is included in a set of wireless devices configured as relay nodes attached to an access node in the wireless network (i.e., relay node 130 is attached to access node 110), and based on determining that the first wireless device is included in the set of wireless devices configured as relay nodes, instructing the first wireless device to not utilize the MU-MIMO operating mode. Thus, for example, a processing node in system 100 may determine or otherwise receive an indicator that device 130 is configured as a relay node (i.e., is allowing end-user wireless devices 150 and 160 to attach to wireless device/relay node 130.) Based on relay node's 130 configuration as a relay node, the processing node in system 100 instructs relay node 130 to not utilize the MU-MIMO operating mode. In addition, or alternatively, based on relay node's 130 configuration as a relay node the processing node in system 100 may instruct access node 110 to not utilize the MU-MIMO operating mode when communicating with relay node 130.

The processing node may also be configured to determine a second wireless device in the sector is not included in the set of wireless devices configured as relay nodes attached to the access node in the wireless network, and based on determining that the second wireless device is not included in the set of wireless devices configured as relay nodes, instruct the second wireless device to start utilizing the MU-MIMO operating mode. Thus, for example, a processing node in system 100 may determine that one or more of wireless devices 120 and/or 140 are end-user wireless devices that do not allow other devices to attach to them. Based on this determination, the processing node may instruct one or more of these end-user wireless devices 120, 140 to start using the MU-MIMO operating mode. In addition, or alternatively, based on the determination that wireless devices 120 and/or 140 are end-use wireless devices, the processing node may instruct access node 110 to start using the MU-MIMO operating mode with one or more of wireless devices 120 and/or 140.

The processing node may also be configured to determine that a number of end-user wireless devices attached to the first wireless device meets a first threshold number. For example, the processing node may determine that two wireless devices (i.e., wireless device 150 and wireless device 160) are attached to relay node 130. The processing node may also be configured to, based on the number of end-user wireless devices meeting the first threshold number, increase a priority of resources allocated towards the first wireless device. Thus, for example, the processing node may, based on the number of devices attached to relay node 130 meeting a first threshold (e.g., 20 device, 30 devices, etc.), increase the priority of relay node 130 for the receipt of resources. The processing node may also be configured to, based on the number of end-user wireless devices meeting a second threshold number, instruct the first wireless device to start utilizing the MU-MIMO operating mode. Thus, for example, the processing node may, based on the number of devices attached to relay node 130 meeting a second threshold (e.g., zero devices), instruct the first wireless device to start utilizing the MU-MIMO operating mode (i.e., since it is not loaded or only lightly loaded, relay node 130 may use the MU-MIMO operating mode without affecting its performance.)

Figure 2:
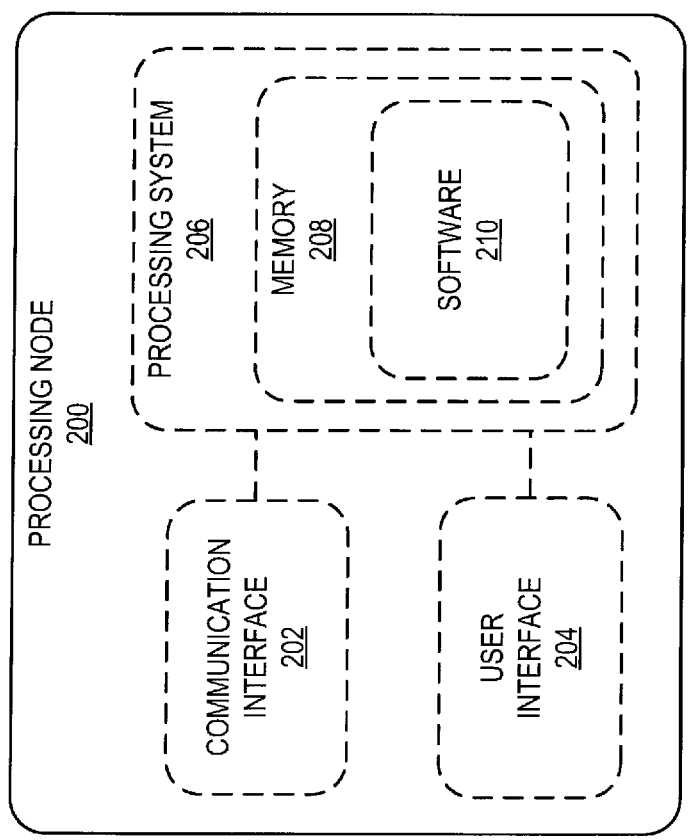
FIG. 2 illustrates an example processing node for instructing wireless devices and relay nodes in wireless networks configured to utilize MU-MIMO.

FIG. 2 illustrates an example processing node for instructing wireless devices and relay nodes in wireless networks configured to utilize MU-MIMO. In FIG. 2, processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a coherence determination module. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
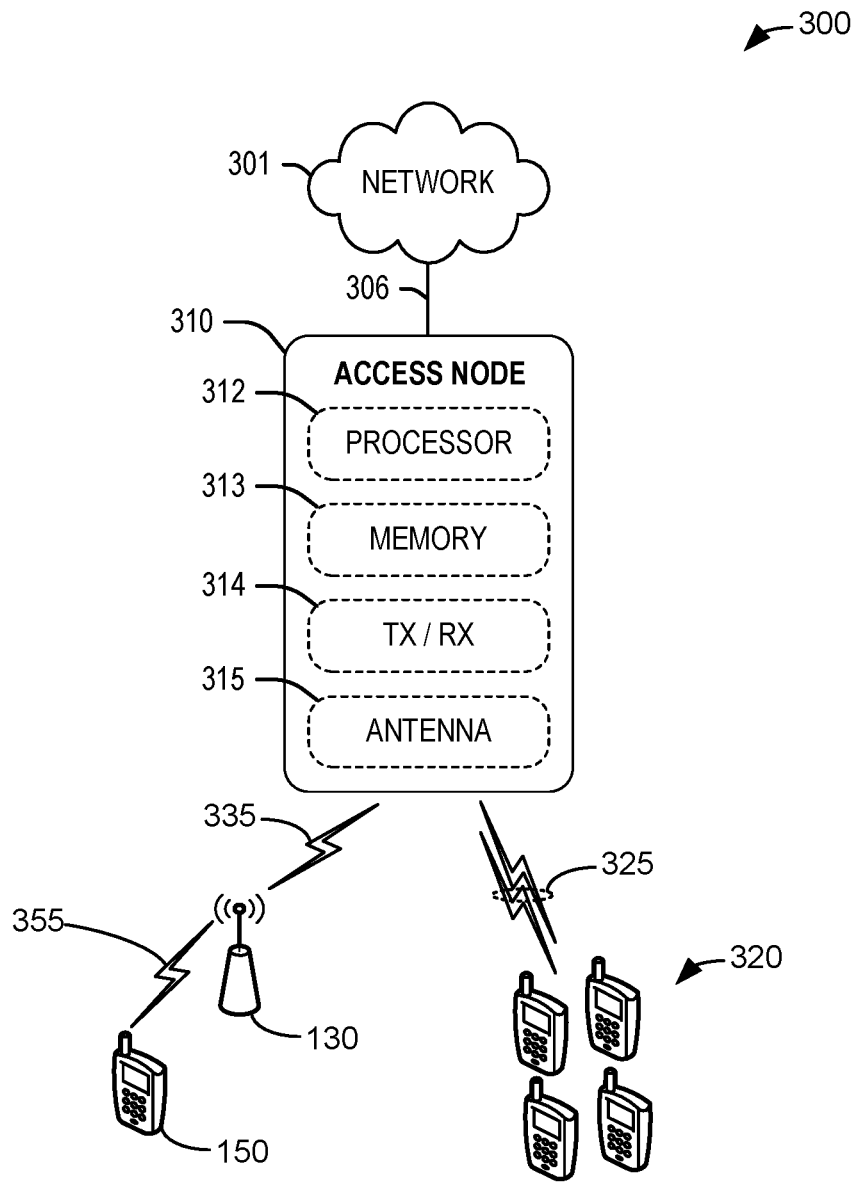
FIG. 3 illustrates an exemplary communication system configured to utilize MU-MIMO and communicate with a relay node.

FIG. 3 illustrates an exemplary communication system configured to utilize MU-MIMO and communicate with a relay node. Communication system 300 comprises network 301, access node 310, end-user wireless devices 320 and 350, and relay node 130. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless devices 320 and relay node 330. Instructions stored on memory 313 can include deploying a wireless air interface via combination of transceiver 314 and antenna 315, enabling wireless devices 320 and relay node 330 to access network services from network 301 via access node 310, and to communicate with end-user wireless device 350 via relay node 330. Thus, access node 310 may be referred to as a donor access node.

Access node 310 may further be configured to identify relay node 330 as being connected thereto, determine a configuration thereof, and schedule resources towards backhauls 325 and 335 based thereon. For example, the configuration of relay node 330 may comprise whether or not backhaul 335 is utilizing MU-MIMO and/or whether or not backhaul 335 is allowed to use MU-MIMO. Access node 310 may associate a first subset of wireless devices in a sector with first indicators that each in the first subset of wireless devices are configured as relay nodes. For example, access node 310 may store information or determine that relay node 330 is configured as a relay node. Access node 310 may be configured to instruct a first at least one wireless device in the first subset of wireless devices to not utilize the MU-MIMO operating mode. For example, access node 310 may instruct or otherwise allocate resources in a manner that prevents relay node 330 from utilizing the MU-MIMO operating mode.

Access node 310 may be further configured to associate the first at least one wireless device in the first subset of wireless devices that have been instructed to not utilize the MU-MIMO operating mode with third indicators that each of the first at least one wireless device is not to be instructed to utilize the MU-MIMO operating mode. For example, after access node 310 has instructed or otherwise allocated resources in a manner that prevents relay node 330 from utilizing the MU-MIMO operating mode, access node 310 may store an indicator of that relay node 330 is configured as a relay node and, even when reconnecting, should not be instructed or otherwise allocated resources that allow relay node 330 to utilize the MU-MIMO operating mode.

Access node 310 may be further configured to also associate a second subset of wireless devices in the sector with fourth indicators that each in the second subset of wireless devices are not configured as relay nodes. For example, access node 310 may associate or otherwise determine that wireless devices 320 are not configured as relay nodes (i.e., wireless device 320 are end-user wireless devices.) Access node 310 may be further configured to instruct a second at least one wireless device in the second subset of wireless devices to start utilizing the MU-MIMO operating mode. For example, based on the indicator(s) that wireless device 320 are not configured as relay nodes, access node 310 may instruct or otherwise allocate resources in a manner that results in wireless devices utilizing MU-MIMO operating mode over link 325. Access node 310 may instruct the second at least one wireless device to start utilizing the MU-MIMO operating mode based on a determination that the second at least one wireless device reports a signal measurement higher than reported by other wireless devices in the second subset of wireless devices.

Access node 310 may also be configured to determine that a number of end-user wireless devices attached to the first wireless device meets a first threshold number. For example, the processing node may determine that one wireless device (i.e., wireless device 350) is attached to relay node 330. Access node 310 may also be configured to, based on the number of end-user wireless devices meeting the first threshold number, increase a priority of resources allocated towards the first wireless device. Thus, for example, Access node 310 may, based on the number of devices attached to relay node 330 meeting a first threshold (e.g., 20 device, 30 devices, etc.), increase the priority of relay node 330 for the receipt of resources. Access node 310 may also be configured to, based on the number of end-user wireless devices meeting a second threshold number, instruct the first wireless device to start utilizing the MU-MIMO operating mode. Thus, for example, Access node 310 may, based on the number of devices attached to relay node 330 meeting a second threshold (e.g., zero devices), instruct relay node 330 to start utilizing the MU-MIMO operating mode (i.e., since it is not loaded or only lightly loaded, relay node 330 may use the MU-MIMO operating mode without affecting performance.)

Figure 4:
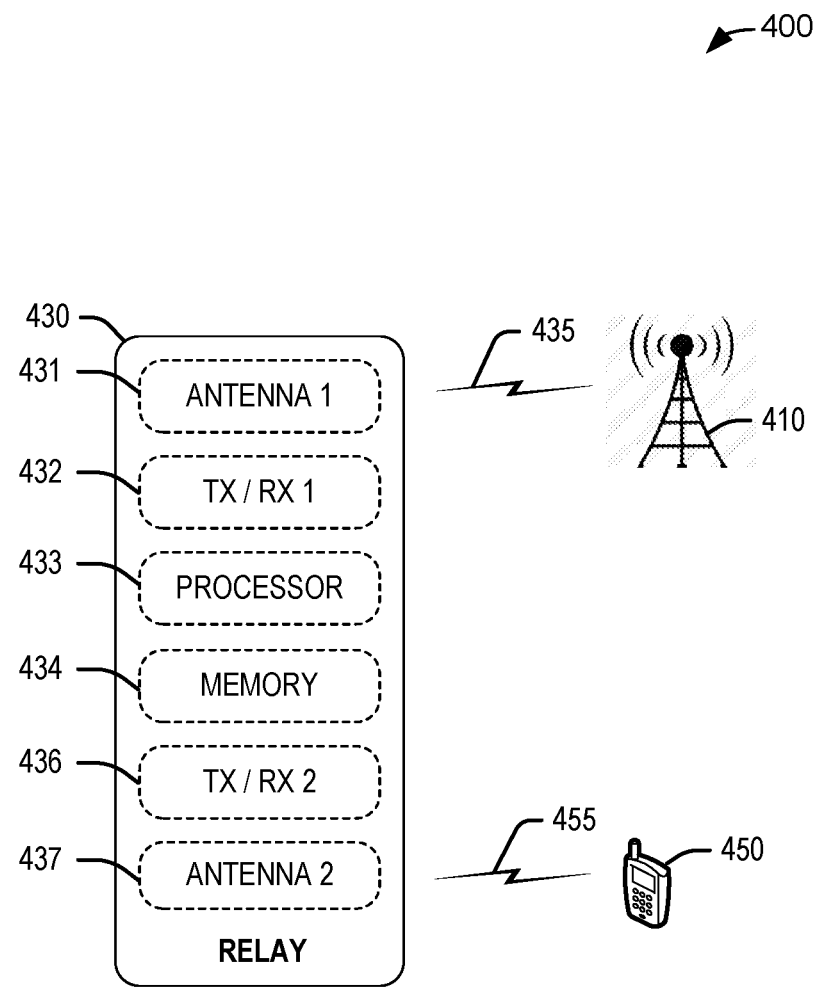
FIG. 4 illustrates an example relay node.

FIG. 4 illustrates an example relay node. In FIG. 4, relay node 430 comprises a first antenna 431, first transceiver 432, processor 433, memory 434, second transceiver 436, and a second antenna 437. Memory 434 may be used for storing instructions that are executed by processor 433. Transceiver 432 and antenna 431 may be used for direct (i.e. unrelayed) communication with donor access node 410 via wireless backhaul link 435. Relay node 430 includes transceiver 436 and antenna 437 for enabling communication with wireless device 450 via link 455 thereby enabling wireless device 450 to attach thereto. When relay node 430 is attached to access node 410, and wireless device 450 is attached to relay node 430, communication system 400 is formed.

Relay node 430 may be configured to identify itself as a relay node to access node 410. Relay node may be configured to receive instructions and resource allocations from access node 410. For example, access node 410 may configure relay node 430 to utilize MU-MIMO on backhaul 435. Access node 410 may configure relay node 430 as to whether or not backhaul 435 is allowed to use MU-MIMO. Relay node 430 may report or otherwise communicate to access node 410 the number of devices attached to relay node 430. Relay node 430 may report or otherwise communicate, to access node 410, one or more signal strength(s) and/or other quality of service indicators associated with the devices (e.g., wireless device 450) attached to relay node 430.

Figure 5:
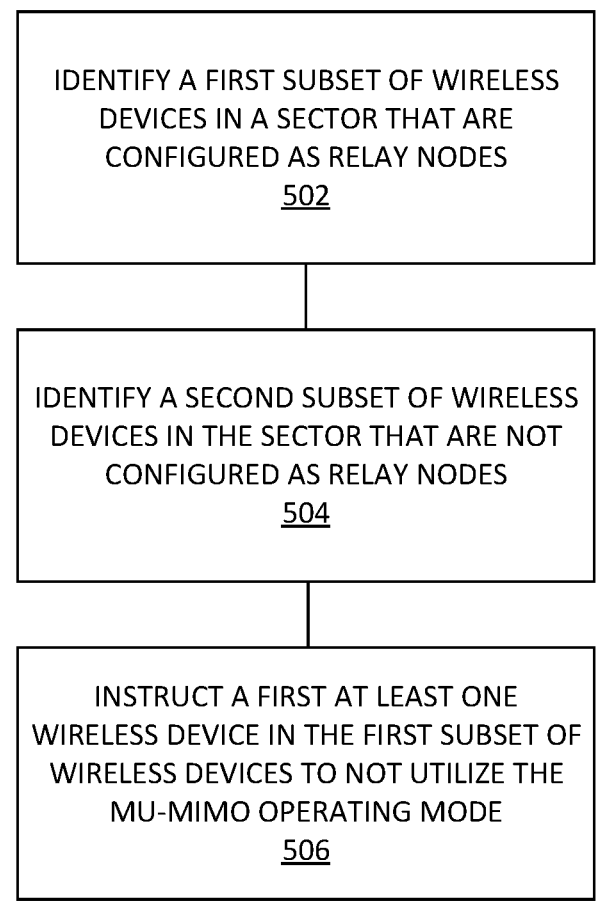
FIG. 5 is a flowchart illustrating a method for scheduling resources in a wireless network configured to utilize a MU-MIMO operating mode.

FIG. 5 is a flowchart illustrating a method for scheduling resources in a wireless network configured to utilize a MU-MIMO operating mode. The steps illustrated in FIG. 5 may be performed by one or more elements of system 100, processing node 200, system 300, system 400, and/or their components. A first subset of wireless devices in a sector that are configured as relay nodes are identified (502). For example, access node 110 may determine that relay node 130 is configured as a relay node.

A second subset of wireless device that are not configured as relay nodes are identified (504). For example, access node 110 may determine that wireless device 120, 140 are end-user wireless devices and are therefore not configured as relay nodes. A first at least one wireless device in the first subset are instructed to not utilize the MU-MIMO operating mode (506). For example, access node 110 may instruct, control, or otherwise allocate resources in a manner that prevents relay node 130 from utilizing a MU-MIMO operating mode on backhaul 135.

Figure 6:
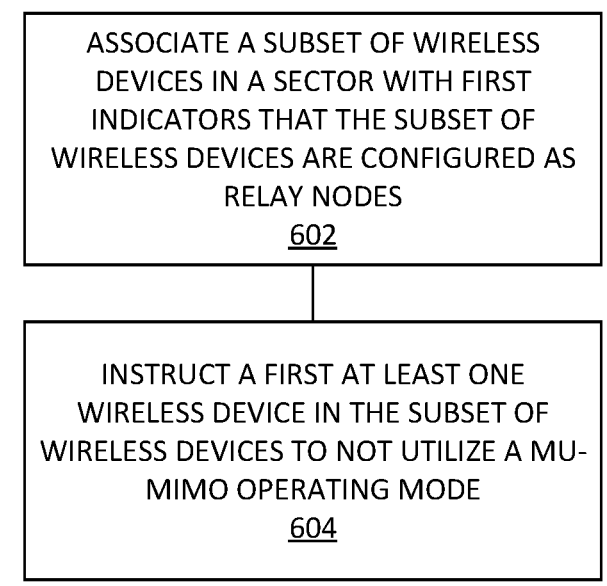
FIG. 6 is a flowchart illustrating a method of operating an access node.

FIG. 6 is a flowchart illustrating a method of operating an access node. The steps illustrated in FIG. 6 may be performed by one or more elements of system 100, processing node 200, system 300, system 400, and/or their components. A subset of wireless devices in a sector are associated with first indicators that the subset of wireless devices are configured as relay nodes (602). For example, access node 110 may determine and store indicators of which wireless devices in sector 111 are configured as relay nodes (i.e., relay node 130) and/or which wireless devices in sector 111 are not configured as relay nodes (i.e., wireless devices 120, 140.)

A first at least one wireless device in the subset of wireless devices is instructed to not utilize a MU-MIMO operating mode (604). For example, access node 110 may instruct, control, or otherwise allocate resources in a manner that results in relay node 130 not utilizing a MU-MIMO operating mode on backhaul 135.

Figure 7:
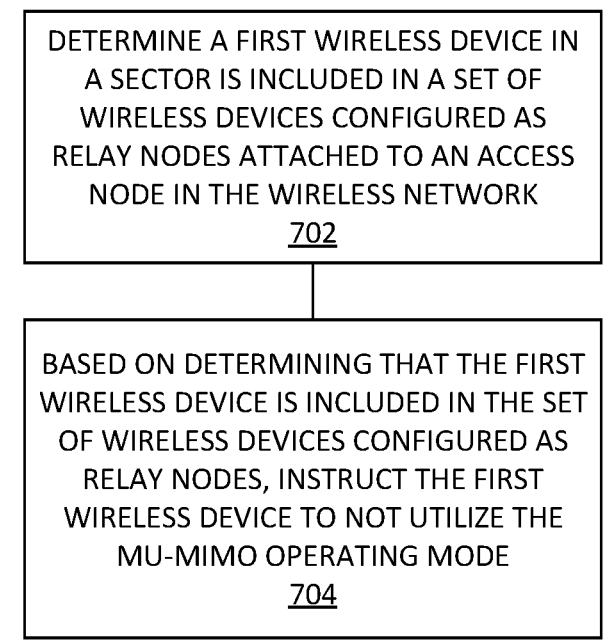
FIG. 7 is a flowchart illustrating a method of instructing relay nodes.

FIG. 7 is a flowchart illustrating a method of instructing relay nodes. The steps illustrated in FIG. 7 may be performed by one or more elements of system 100, processing node 200, system 300, system 400, and/or their components. It is determined that a first wireless device in a sector is included in a set of wireless device configured as relay nodes attached to an access node in the wireless network (702). For example, access node 110 may determine that relay node 130 is configured as an access node. Based on determining that the first wireless device is included in the set of wireless devices configured as relay nodes, the first wireless device is instructed to not utilize a MU-MIMO operating mode (704). For example, based on the determination that relay node 130 is configured as a relay node, access node 110 may instruct, control, or otherwise allocate resources in a manner that results in relay node 130 not utilizing a MU-MIMO operating mode on backhaul 135.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for scheduling resources in a wireless network configured to utilize a multi-user multiple-input multiple-output (MU-MIMO) operating mode, the method comprising:
   identifying a first subset of wireless devices in a sector that are configured as relay nodes;
   identifying a second subset of wireless devices in the sector that are not configured as relay nodes;
   instructing a first wireless device in the first subset of wireless devices not to utilize the MU-MIMO operating mode;
   receiving, from the first wireless device in the first subset of wireless devices a report indicating a number of attached end-user wireless devices;
   determining when the number of attached end-user wireless devices to the first wireless device in the first subset satisfies a first threshold number;
   determining when the number of attached end-user wireless devices to the first wireless device in the first subset satisfies a second threshold number;
   increasing a priority of resources allocated to the first wireless device in the first subset having a number of attached end-user wireless devices satisfying the first threshold number; and
   instructing the first wireless device in the first subset of wireless devices to start utilizing the MU-MIMO operating mode based on the number attached of end-user wireless devices satisfying the second threshold number.

2. The method of claim 1, further comprising:
   instructing a second at least one wireless device in the second subset of wireless devices to start utilizing the MU-MIMO operating mode.

3. The method of claim 2, wherein instructing the second at least one wireless device to start utilizing the MU-MIMO operating mode further comprises:
determining that the second at least one wireless device reports a signal measurement higher than reported by other wireless devices in the second subset of wireless devices.

4. The method of claim 1, further comprising performing the identifying and instructing operations within a time period.

5. The method of claim 1, wherein the first threshold number is greater than the second threshold number.

6. A system for scheduling resources in a wireless network configured to utilize a multi-user multiple-input multiple-output (MU-MIMO) operating mode, the system comprising:
a processing node; and
a processor coupled to the processing node, the processor configured to perform operations comprising:
associating a first subset of wireless devices in a sector with first indicators that each wireless device in the first subset of wireless devices is configured as a relay node;
instructing a first wireless device in the first subset of wireless devices to not utilize the MU-MIMO operating mode
receiving, from the first wireless device in the first subset of wireless devices a report indicating a number of attached end-user wireless devices;
determining when the number of attached end-user wireless devices to the first wireless device in the first subset satisfies a first threshold number;
determining when the number of attached end-user wireless devices to the first wireless device in the first subset satisfies a second threshold number;
increasing a priority of resources allocated to the first wireless device in the first subset having a number of attached end-user wireless devices satisfying the first threshold number; and
instructing the first wireless device in the first subset of wireless devices to start utilizing the MU-MIMO operating mode based on the number of attached end-user wireless devices satisfying the second threshold number.

7. The system of claim 6, wherein the processor is further configured to perform operations comprising:
instructing an access node not to use MU-MIMO operating mode when communicating with the first wireless device.

8. The system of claim 7, wherein the processor is further configured to perform operations comprising:
associating a second subset of wireless devices in the sector with fourth indicators that each in the second subset of wireless devices are not configured as relay nodes.

9. The system of claim 8, wherein the processor is further configured to perform operations comprising:
instructing a second at least one wireless device in the second subset of wireless devices to start utilizing the MU-MIMO operating mode.

10. The system of claim 9, wherein instructing the second at least one wireless device to start utilizing the MU-MIMO operating mode further comprises:
determining that the second at least one wireless device reports a signal measurement higher than reported by other wireless devices in the second subset of wireless devices.

11. The system of claim 6, wherein the first threshold number is greater than the second threshold number.

12. A processing node for scheduling resources in a wireless network configured to utilize a multi-user multiple-input multiple-output (MU-MIMO) operating mode, the processing node comprising:
a memory storing instructions; and
a processing system accessing the instructions in the memory to perform operations comprising:
determining a first wireless device in a sector is included in a set of wireless devices configured as relay nodes attached to an access node in the wireless network;
based on determining that the first wireless device is included in the set of wireless devices configured as relay nodes, instructing the first wireless device to not utilize the MU-MIMO operating mode;
receiving, from the first wireless device in the set of wireless devices a report indicating a number of attached end-user wireless devices;
determining when the number of attached end-user wireless devices to the first wireless device in the set satisfies a first threshold number;
determining when the number of attached end-user wireless devices to the first wireless device in the set satisfies a second threshold number;
increasing a priority of resources allocated to the first wireless device in the set having a number of attached end-user wireless devices satisfying the first threshold number; and
instructing the first wireless device in the set of wireless devices to start utilizing the MU-MIMO operating mode based on the number of attached end-user wireless devices satisfying the second threshold number.

13. The processing node of claim 12, wherein the operations further comprise:
determining a second wireless device in the sector is not included in the set of wireless devices configured as relay nodes attached to the access node in the wireless network; and,
based on determining that the second wireless device is not included in the set of wireless devices configured as relay nodes, instructing the second wireless device to start utilizing the MU-MIMO operating mode.

14. The processing node of claim 12, wherein the first threshold number is greater than the second threshold number.

* * * * *